Nov. 25, 1930.  W. I. McLAUGHLIN  1,782,474
TIME CONTROLLED COMPASS INDICATOR
Filed Feb. 16, 1926
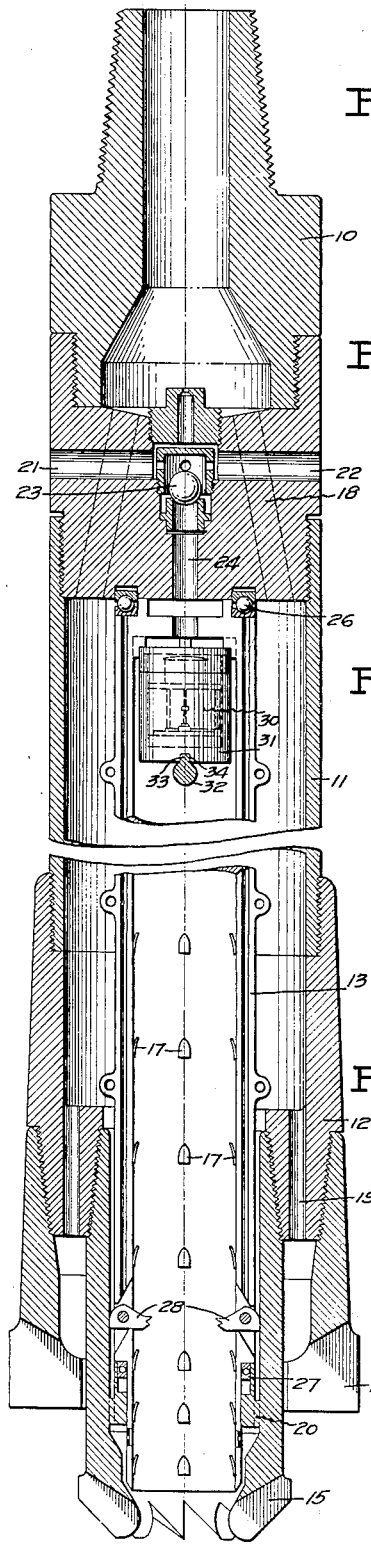
FIG.1.
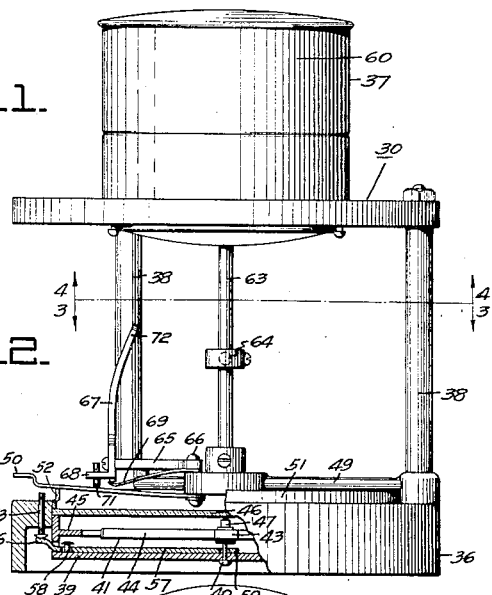
FIG.2.
FIG.3.
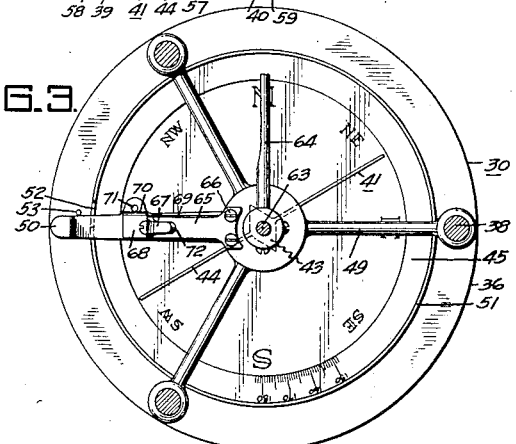
FIG.4.
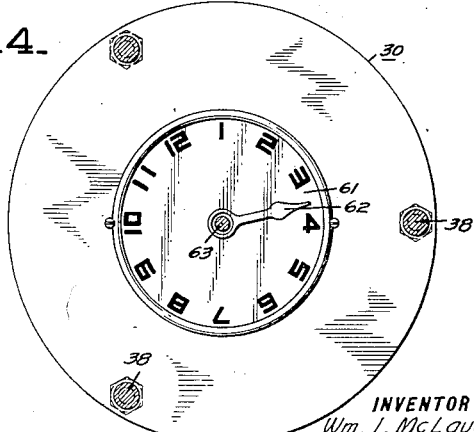
INVENTOR
Wm. I. McLaughlin.
BY White & Prost
his ATTORNEYS Patented Nov. 25, 1930

1,782,474

UNITED STATES PATENT OFFICE

WILLIAM I. McLAUGHLIN, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE

TIME-CONTROLLED COMPASS INDICATOR

Application filed February 16, 1926. Serial No. 88,540.

This invention relates to a device for determining the dip and strike of a sub-strata of rock and is a division in part of my application No. 714,668, filed May 20, 1924. More specifically the invention relates to a time controlled compass indicator which is adapted to be detachably secured to the core retainer of an earth boring drill, as described in the above application.

It is therefore an object of this invention to devise a time controlled compass indicator which is especially adapted to be secured to the core retainer of a core barrel for the purpose of determining the dip and strike of a sub-strata of rock.

It is a further object of this invention to provide a freely movable compass with time controlled mechanism for fixing the position of the compass relative to its mounting after the lapse of a predetermined period of time.

It is a further object of this invention to provide a freely movable compass with means releasable for fixing the compass relative to its mounting and to control the release of said means by clockwork mechanism. It is proposed to devise the releasable means so that it will not interfere with the continuous movement of the clockwork mechanism.

It is a further object of this invention to devise a novel form of means releasable to fix the position of the compass relative to its mounting. It is proposed to employ a leaf spring movable either to active or to inactive position and to cause movement of the spring to its active position by clockwork mechanism.

Further objects of the invention will appear from the following description in which the preferred embodiment of the invention is set forth in detail.

Referring to the drawings:

Figure 1 is a transverse sectional view showing the device of this invention applied to the rotatable retainer of a core barrel.

Fig. 2 is a detail view of the time controlled compass mechanism, certain parts being shown in cross section.

Fig. 3 is a sectional view along the line 3—3 of Fig. 2.

Fig. 4 is a cross section along the line 4—4 of Fig. 2.

In determining the dip and strike of a sub-strata of rock, that is, in determining the maximum declination from the horizontal and the direction of the maximum declination, by means of an earth boring drill of the core type, it is necessary to provide some means for determining the original position which a core taken through the strata occupied with respect to the points of the compass. As explained in my application No. 714,668, previously referred to, this may be accomplished by employing a core barrel which is provided with a rotatable core retainer and securing a freely movable magnetic compass needle upon this core retainer together with time controlled means for fixing the position of the magnetic needle with respect to the core retainer after the lapse of a predetermined period of time. This period of time is made sufficiently long so that the position of the magnetic needle will not be fixed until after the desired core has been formed by the barrel. Subsequently the core barrel is raised and the position which the core originally occupied in the earth with respect to the compass needle marked upon the surface of the core by noting the position of the fixed compass needle. After the core has been thus marked the dip and strike may be accurately determined by the use of such a protractor as shown in my copending application No. 70,779, filed Nov. 23, 1925. This application is concerned only with the special form of mounting for the compass needle and with the mechanism for fixing the position of the needle with respect to its mounting after the lapse of a predetermined period of time.

In Fig. 1 of the drawings the time controlled indicator has been shown as applied to the rotatable core retainer of a core barrel. The particular form of core barrel illustrated comprises briefly a head 10, body portion 11, and a drill portion 12. Within the body portion 11 there is rotatably mounted a split or separable core retainer 13. The drill portion 12 comprises an outer annular bit portion 14 and an inner annular bit 15. The outer bit 14 is adapted to cut away sufficient material to allow the sides of the core barrel to clear the sides of the hole being drilled, while the inner annular bit 15 serves to properly dimension the core so that it will readily enter the core retainer 13. This double arrangement of drill bits also reduces the possibility of fracturing the core while it is being formed. The inner surface of the core retainer 13 is provided with a plurality of spring fingers 17 which extend upwardly and serve to center the core within the retainer to prevent relative rotation between the core and retainer, and to mark upon the core in case relative rotation does occur between the core or any portion thereof and the core retainer. The head 10 and drill portion 12 are also provided with suitable ports or passages 18 and 19 respectively for the circulation of lubricating mud to the drill bits 14 and 15. Ports 20 are also provided so that the lubricating mud may circulate downward between the core retainer and the body portion 11 to discharge between the annular bits 14 and 15 and between the bit 15 and the core retainer 13. The head 10 is also provided with ports 21 and 22 for diverting a portion of the circulating mud so that it will pass around the outer surface of the head 10. A valve 23 is also arranged above the core retainer and communicates with the latter through the port 24 so as to relieve the pressure within the retainer as the core progresses upwardly. The core retainer is suitably journaled adjacent its upper and lower ends as at 26 and 27 respectively, so that it is free to rotate and thus remain stationary with respect to the core. Pivoted dogs 28 are provided to sever the core upon lifting the barrel.

The time controlled compass indicator designated generally at 30 is positioned within a water-tight non-magnetic casing 31 which in turn is detachably secured to the upper end of the core retainer. The core retainer and the core barrel are also preferably made of non-magnetic material so as not to interfere with the action of the compass needle. In order to detachably retain the casing 31 to the core retainer the retainer is provided with a transverse bar 32 having an upper tongue 33 which fits into a groove 34 provided in the bottom of the casing 31. Figs. 2 to 4 show the indicator removed from the casing 31. This device includes generally a mounting comprising a lower casing 36 adapted to house a compass needle and an upper casing 37 adapted to house a clockwork mechanism and which is held in spaced relation to the casing 36 as by means of spacing rods 38. Positioned within the casing 36 there is a cup shaped housing 39 carrying a central pivot pin 40 upon which is mounted the magnetic compass needle 41. This magnetic needle is designed to minimize the natural dip of a magnetic needle along the lines of force through the earth. Instead of being constructed with a single magnetic bar this compass needle comprises a short magnetic bar 43 having a relatively long transverse non-magnetic needle 44. The casing 39 is provided with an inner annular flange 45 having its upper surface graduated to indicate the points of the compass. The upper side of the housing is covered by a transparent face 46, the lower surface of which is adjacent the end of a projection 47 on the compass needle 41 for a purpose later to be described.

Releasable means have been provided for fixing the position of the compass needle relative to the casing 36. Thus, arranged above the casing 36 there is secured a spider 49 upon which is pivotally mounted a leaf spring 50. This leaf spring 50 is adapted to be moved in one position to engage a shoulder on the upper edge of an annular flange 51 and to another position to enter the slot 52 in this flange. Adjacent the slot 52 and loosely mounted in the casing 36 there is a pin 53 adapted to engage the outer end 56 of the lever 57. This lever is loosely fulcrumed to the housing 39 as at 58 and has its inner end 59 apertured to surround the pivot pin 40. Upon movement of leaf spring 50 from an inactive position, that is, the position in which it engages the flange 51, to an active position in which it presses downward upon the pin 53, the inner end 59 of the lever 57 will be forced upward to lift the compass needle 44 and press the projection 47 against the lower surface of the face 46.

Means including clockwork mechanism are provided for moving the leaf spring 50 to its active position to cause the compass needle to be fixed relative to the casing 36 after the lapse of a predetermined period of time. The clockwork mechanism is positioned within the upper casing 37 which is provided with a removable cover 60 to permit winding and setting of the same. The face 61 of the clock is marked off to read in hours and the hour hand 62 is provided with an extended shaft 63 which depends from the casing 37. This shaft preferably has its lower end suitably journaled in the spider 49 and is provided with an adjustable arm or actuator 64. A bracket 65 is also secured to the spider 49 as by means of the screws 66 and this bracket has a lever 67 pivotally mounted upon its outer end. The lower and shorter end of this lever is provided with a flattened portion 68 which engages with a leaf spring 69 so as to retain it in upright position until rotated through a substantial angle. This lower end is also provided with an out-turned portion 70, the edge of which is adapted to engage an up-standing pin 71 mounted upon the leaf spring 50. The upper end 72 of the lever 67 is adapted to extend into the path of movement of the actuator 64. Rotation of the lever 67 in one direction tends to move the leaf spring 50 to its active position.

The operation of this device is briefly as follows: The operator first determines by experiment the position which the hour hand 62 occupies when the actuator 64 causes the leaf spring 50 to be moved to its active position. Then if, for example, it is desired to have the compass needle fixed within a period of four hours the hour hand is set in such a position that it must pass through an angular movement corresponding to four hours before the actuator 64 causes the fixing of the compass. As the limit of this period is approached the actuator 64 presses against the upper portion 72 of the lever 67 to rotate this lever to cause the leaf spring 50 to be moved in position to enter the slot 52. Since the upper portion 72 of the lever 67 is relatively longer than its lower portion, a comparatively small amount of force is required to move the leaf spring 50 and therefore operation of the clockwork mechanism will not be interrupted. This is an important feature since it is often desirable to determine the exact time when the compass became fixed, by noting the position of the hour hand after lifting the core. When the leaf spring 50 is moved so that it may enter the slot 52 or when it is moved to its active position it presses downward upon the pin 53 to cause the inner end 59 of the lever 57 to lift the compass needle into contact with the lower surface of the face 46. The frictional contact between the projection 47 and the lower surface of the face will prevent further relative movement of the compass needle. It is of course to be understood that this fixing of the needle occurs subsequent to the drilling operation and before the core has been lifted. After lifting the core and opening the core retainer the position which the core originally occupied in the earth with respect to the points of the compass may be accurately determined by reference to the compass needle. It will be noted that the release mechanism is designed so that it cannot be accidentally released by jarring or vibration of the drill.

I claim:

1. In a time controlled compass indicator, a mounting, a freely movable compass needle secured to said mounting, a pivoted leaf spring capable of pivotal movement from an inactive to an active position about an axis normal to the direction of deformation of the spring, clockwork mechanism secured to said mounting, an actuator moved by said clockwork mechanism and having a portion enagageable to move said spring to its active position, and means actuated by said spring for fixing the compass needle with respect to said mounting.

2. In a time controlled compass indicator, a mounting having a shoulder, a freely movable compass needle secured to said mounting, a spring pivotally connected to said mounting, said spring being capable of being deformed in a direction normal to the axis of said pivotal connection, a shoulder formed on said mounting and relatively fixed with respect to the same, said spring being in an inactive position when swung about its pivotal connection into engagement with the shoulder and in an active position when swung about its pivotal connection out of engagement with the shoulder, means for moving said spring about said axis from said inactive to said active position after the lapse of a predetermined period of time, and means actuated by said spring for fixing the compass needle with respect to said mounting.

3. In a time controlled compass indicator, a mounting having a shoulder, a freely movable compass needle secured to said mounting, a pivotally mounted leaf spring capable of being moved about its pivotal axis into and out of engagement with said shoulder, said spring being in an inactive position when in engagement with the shoulder and in an active position when out of engagement with the shoulder, a pivoted lever having its one end engageable to move said spring to its active position, a clock controlled actuator arranged to engage the other end of the lever, and means actuated by said spring for fixing the compass needle relative to said mounting.

4. A device of the class described comprising a support having a relatively fixed shoulder, a compass needle pivotally mounted on said support, a leaf spring having one of its ends pivotally secured to the support to swing about an axis normal to the direction of deformation of the spring, the free end of said spring normally engaging said shoulder, means for rotating the free end of the spring to bring the same out of engagement with the shoulder after the lapse of a predetermined period of time, and means actuated by the spring in said shifted position for fixing the position of the compass needle relative to the support.

5. In a time controlled compass, a pivotally mounted magnetic compass needle, clockwork mechanism, a shaft driven by said mechanism, an arm carried by said shaft, a leaf spring mounted to swing about a pivotal axis, a shoulder for engaging the free end of said spring, means engageable by said spring when the same is swung out of engagement with said shoulder for fixing the position of the needle, and a pivotally mounted lever having one end thereof extending into the path of movement of said arm and the other end thereof engageable with said leaf spring.

In testimony whereof, I have hereunto set my hand.

WILLIAM I. McLAUGHLIN.